Figure 1:
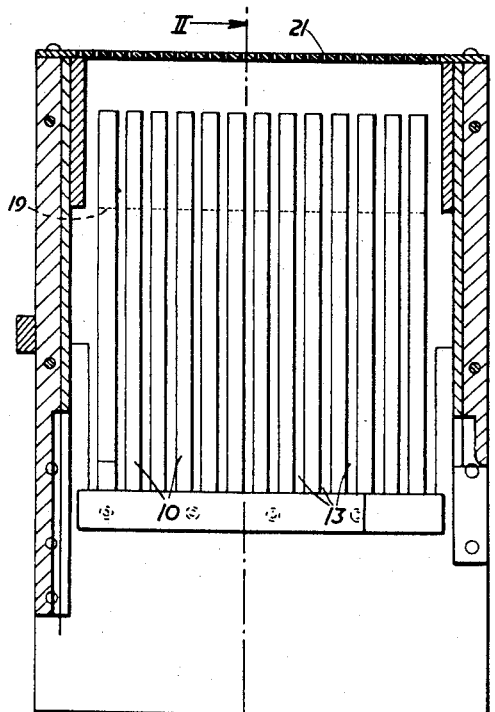

Nov. 3, 1959   D. LEGG ET AL   2,911,505
ARC CHUTES
Filed Nov. 6, 1956

INVENTORS
DUNCAN LEGG
THOMAS R. MANLEY
BY *Watson, Cole, Grindle*
*& Watson*
ATTORNEYS United States Patent Office 2,911,505
Patented Nov. 3, 1959

2,911,505
ARC CHUTES

Duncan Legg, South Shields, and Thomas R. Manley, Fenham, Newcastle-upon-Tyne, England, assignors to A. Reyrolle & Company Limited, Hebburn, England, a company of Great Britain Application November 6, 1956, Serial No. 620,622

5 Claims. (Cl. 200—144)

This invention relates to arc chutes of the type comprising a stack of spaced insulating plates whose surfaces are afforded by arc-resisting refractory insulating material upon which an arc cannot root, the arc entering the chute with its length extending transversely to the planes of the plates and being urged through the chute so as to be forcibly lengthened in the spaces between adjacent plates whilst still extending around the edges of those plates into the adjacent spaces. In this type of arc chute the arc is forcibly elongated in a single length, as contrasted with the type of chute in which the arc is split into several short lengths between spaced electrically-conducting plates.

The surfaces of the plates of an arc chute of the type specified must be of insulating material so that the arc shall not root on them, and such plates may comprise flat or bent ferrous metal sheets enveloped in a suitable insulating material which is both sufficiently resistant to the heat and erosive effects of the arc and is a sufficiently good dielectric material to resist electrical puncture. One such insulating material is the material known by the trade-mark Micatherm, but when the sheet is enveloped in this material the thickness of the finished plate cannot be made less than about one quarter inch. The purpose of the ferrous metal sheets is to urge the arc through the chute by magnetic interaction.

The working voltage for which an arc chute of this type is designed determines the length to which the arc must be stretched for reliable extinction, and so determines the number of plates required in the stack. The thinner each plate can be made, the less will be the corresponding dimension of the whole stack, but the thinness of each plate is limited by the thermal, electrical and mechanical properties of the material used for the envelope.

According to the present invention in an arc chute of the type specified in which some or all of the arc chute plates are of the construction comprising a ferrous metal sheet enveloped in insulating material, the surfaces of the metal sheets are coated with two superimposed layers of electrically insulating material, namely an inner layer of a material which is essentially of high dielectric strength and an outer layer of refractory insulating material which is essentially highly arc resistant but is of lower dielectric strength than the material of the inner layer.

By the use for each of the two layers of a material which is particularly suited to the function of that layer, the combined thickness of the two superimposed layers can be made less than the thickness of any known single material that would be required to provide the same degree of electrical insulation and resistance to erosion by the arc, and consequently the thickness of the finished plate can be made less than if a single compromise material were used for the whole of the envelope enclosing the ferrous metal sheet.

The inner layer may comprise a synthetic resin dielectric material applied to the metal sheet by dipping, spraying, brushing or casting, or a material in tape form wrapped around the sheet and secured to it by a suitable adhesive. Preferably the material comprising the outer layer has low thermal conductivity. The outer layer may be made of any suitable refractory material such as fireclay or a refractory cement, having a high degree of resistance to thermal shock and erosion, and applied in any suitable manner. Its outer surface may be glazed to reduce the possibility of surface tracking.

A thin layer of powdered refractory material such as sand or quartz may be sandwiched between the inner and outer layers of the envelope, so as to provide a good key for the outer layer.

Figure 2:
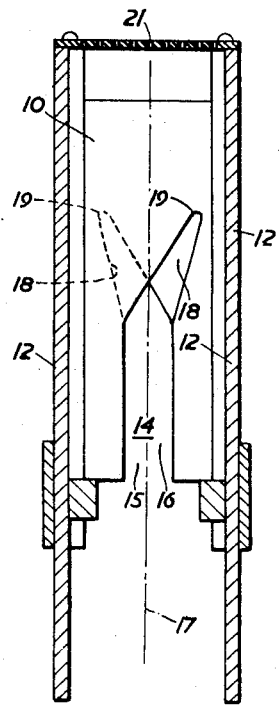
Figure 3:
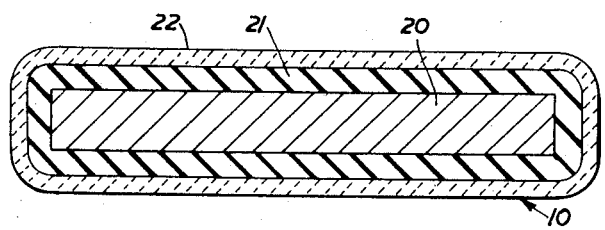
Figure 4:
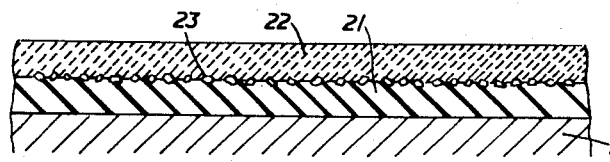

The invention may be carried into practice in various ways, but two specific embodiments will now be described by way of example with reference to the accompanying drawings in which:

Figure 1 is a side elevation, partly in section, of an arc chute of the type specified, Figure 2 is a cross-section on the line II—II of Figure 1, Figure 3 is a diagrammatic cross section of the upper part of one of the plates of the arc chute of Figures 1 and 2, the thickness of the plate being shown considerably exaggerated for clarity in comparison with its width, and Figure 4 is a fragmentary cross-section, on an enlarged scale, of part of a modified form of arc chute plate.

Figures 1 and 2 illustrate an arc chute for an air-break circuit-breaker comprising a rectangular container of insulating material within which are mounted a series of spaced parallel elongated plates 10 whose surfaces are of insulating material and whose edges are supported between the side walls 12 of the arc chute. The plates 10 thus comprise partitions defining a series of elongated open-ended compartments 13 within the arc chute, each compartment being narrow in proportion to its width and length. Each plate 10 is formed with a slot 14 which is open at its lower end 15 adjacent the lower part of the arc chute where the arc is initially drawn or initially enters the arc chute. Each slot 14 extends along about two-thirds of the length of the plate 10. The lower part 16 of each slot 14 is parallel sided and extends along the centre line 17 of the plate, whilst the upper parts 18 of the slots 14 are tapered and diverge alternately to left and right of the centre lines 17 of the successive plates 10, so that the closed upper ends 19 of the slots are staggered alternately to left and right of the plane through the centre lines 17 of the plates.

Each plate 10 comprises a sheet 20 of magnetic material, for example iron, which is embedded in the insulating material forming the exterior of the plate, the magnetic sheet 20 being correspondingly slotted so as to closely surround the slots 14. Thus when an arc is drawn or enters the lower end of the arc chute transversely to the plates 10 in the region of the lower open ends 15 of the slots, the arc will be drawn up the slots by magnetic interaction with the magnetic sheets 20 and will be forced up to the closed ends 19 of the slots. As the plates 10 are coated with insulating material the arc cannot root on the plates, and consequently it will be forced to assume a zig-zag shape, extending around the edges of the slots 14 between adjacent compartments 13, and will be correspondingly lengthened and simultaneously cooled until it is finally extinguished.

The upper end of the arc chute is covered by a perforated grid 21 through which the exhaust gases issue when the arc has been extinguished.

As illustrated in Figure 3, the internal magnetic sheet 20 of each of the plates 10 is coated with two superimposed layers 21 and 22 of different insulating materials.

The inner layer 21 is of an electrically insulating material of high dielectric strength, for example a suitable synthetic resin such as a cold-setting polyester resin of the type known by the trade name Marco, or a silicone varnish such as that known as "M.S.996" or a phenolic-based varnish of the type which is known as "M.472" or an epoxide resin such as those sold under the trade names "Epikote" and "Araldite." Alternatively the inner layer may be of an insulating tape such as silicone-bonded glass tape, polythene tape, or tape of the polyethylene terephthalate material such as is sold under the trade name "Melinex." The inner layer may be applied in one or more coats by dipping, spraying, brushing or casting, or in tape form by winding the tape around the magnetic sheet 20 or by gluing the tape to the sheet by means of a suitable adhesive such as an epoxide resin glue.

The outer layer 22 of the arc chute plate 10 is made of an electrically non-conducting material which is highly resistant to the heat and erosive effect of the arc; it is beneficial if this material also has low thermal conductivity so that excessive heat from the arc will not be transmitted to the inner layer 21. Suitable materials for the outer layer 22 are fireclay, and cements of alumina, silica, magnesia and zircon. Some examples of materials which may be used are those sold under the trade names "K Cement" and "Tiluma."

The outer surface of the outer layer 22 is smooth and polished, and preferably glazed, so that liability to surface tracking is reduced.

In order that the inner layer 21 should not be damaged during the application of the outer layer 22, the latter is preferably made of material in a form which will reach its finished state without heat treatment at a temperature higher than 250° C; in many cases air drying at room temperature is sufficient for the development of satisfactory properties in the outer layer 22.

In the modified embodiment illustrated in Figure 4, powdered refractory material such as fine sand or quartz grains is dusted on to the outer surface of the inner layer 21 before the outer layer 22 is applied, so as to form a thin intermediate refractory layer 23 between the layers 21 and 22 of the finished plate. This intermediate layer 23 provides a good key for the outer layer 22. The outer surface of the inner layer 21 will in all probability be tacky at some stage of its application and the refractory powder should preferably be applied at this stage so that it will stick to the inner layer 21. Alternatively, where the inner layer 21 is in tape form or is made of non-adhesive material, a very thin coating of an epoxide adhesive may be applied to the inner layer 21 to hold the grains of powdered refractory material. The layer of powder 23, in addition to assisting in the adhesion of the outer layer 22, constitutes an additional refractory layer in the envelope of the arc chute plate.

What we claim as our invention and desire to secure by Letters Patent is:

1. An arc chute for an air-break circuit-breaker comprising a stack of spaced insulating plates whose surfaces are afforded by arc-resisting refractory insulating material upon which an arc cannot root, each plate being formed with a slot open at one end of the stack where the arc enters and closed at the opposite end, and the slots in adjacent plates being in registry at their open ends but diverging alternately to left and right towards their closed ends, in which each of the majority of the arc chute plates comprises a ferrous metal sheet coated with two superimposed layers of different electrically insulating materials, namely an inner layer of a material which is essentially of high dielectric strength and an outer layer of refractory insulating material which is essentially highly arc resistant but is of lower dielectric strength than the material of the inner layer.

2. An arc chute as claimed in claim 1 in which the material of the inner layer comprises a synthetic resin dielectric material.

3. An arc chute as claimed in claim 1 in which the inner layer comprises dielectric material in tape form wrapped around or glued to the ferrous sheet.

4. An arc chute as claimed in claim 1 in which the material of the outer layer has low thermal conductivity.

5. An arc chute as claimed in claim 4 in which the material of the outer layer comprises a refractory cement.

References Cited in the file of this patent

UNITED STATES PATENTS

| | | |
|---|---|---|
| 2,293,487 | Bartlett | Aug. 18, 1942 |
| 2,345,724 | Baker et al. | Apr. 4, 1944 |
| 2,439,929 | Hill et al. | Apr. 20, 1948 |

FOREIGN PATENTS

| | | |
|---|---|---|
| 547,549 | Germany | Mar. 26, 1932 |
| 539,025 | Great Britain | Aug. 26, 1941 |